United States Patent
Song

(10) Patent No.: US 7,157,931 B2
(45) Date of Patent: Jan. 2, 2007

(54) TERMINATION CIRCUITS HAVING PULL-DOWN AND PULL-UP CIRCUITS AND RELATED METHODS

(75) Inventor: Ho-young Song, Kyungki-do (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 122 days.

(21) Appl. No.: 10/765,403

(22) Filed: Jan. 26, 2004

(65) Prior Publication Data

US 2004/0189342 A1 Sep. 30, 2004

(30) Foreign Application Priority Data

Jan. 27, 2003 (KR) ...................... 10-2003-0005234

(51) Int. Cl.
*H03K 19/003* (2006.01)
(52) U.S. Cl. .......................................... 326/30; 326/31
(58) Field of Classification Search ................... 326/30
See application file for complete search history.

(56) References Cited

U.S. PATENT DOCUMENTS

| | | | | |
|---|---|---|---|---|
| 5,329,190 A * | 7/1994 | Igarashi et al. ............. | 327/309 |
| 5,426,383 A * | 6/1995 | Kumar ........................ | 326/119 |
| 5,729,152 A * | 3/1998 | Leung et al. ................. | 326/21 |
| 6,127,840 A * | 10/2000 | Coteus et al. ................. | 326/30 |
| 6,356,105 B1 * | 3/2002 | Volk ............................. | 326/30 |
| 6,501,293 B1 * | 12/2002 | Braceras et al. .............. | 326/30 |
| 6,747,476 B1 * | 6/2004 | Whitworth .................... | 326/30 |

* cited by examiner

*Primary Examiner*—James H. Cho
(74) *Attorney, Agent, or Firm*—Myers Bigel Sibley & Sajovec

(57) ABSTRACT

A termination circuit for a transmission line may include an input node, a pull-down circuit, and a pull-up circuit. The input node receives an input signal over the transmission line. The pull-down circuit is coupled between the input node and a first reference voltage, and the pull-down circuit may be configured to provide an electrical path between the first reference voltage and the input node responsive to the input signal having a first voltage level. The pull-up circuit is coupled between the input node and a second reference voltage, and the pull-up circuit is configured to provide an electrical path between the second reference voltage and the input node responsive to the input signal having a second voltage level. More particularly, the first reference voltage is less than the second reference voltage, and the first voltage level is greater than the second voltage level. Related methods are also discussed.

32 Claims, 5 Drawing Sheets

TERMINATION CIRCUITS HAVING PULL-DOWN AND PULL-UP CIRCUITS AND RELATED METHODS

CROSS REFERENCE TO RELATED APPLICATION

This application claims the priority of Korean Patent Application No. 2003-5234, filed on 27 Jan. 2003 in the Korean Intellectual Property Office, the disclosure of which is hereby incorporated by reference in its entirety.

FIELD OF THE INVENTION

The present invention relates to the field of electronics, and more particularly, to termination circuits for electronic devices.

BACKGROUND

Devices having high-speed operating characteristics, operating in response to high clock frequencies, and/or requiring long transmission lines may exhibit undershoot signal reflections and/or undesired transmission line effects.

If a signal with a "0" voltage level travels down a bus or a long transmission line, the signal may then inverted to a "5" voltage level, and an impedance mismatch between a receiver circuit and the bus or the transmission line may be left uncorrected so that, reflection may occur on the transmission line or at one or both ends of the bus. Because of the reflection, the signal may take a long time to stabilize after the voltage level transition from "0" to "5" volts.

High-speed semiconductor devices may have reduced clock signal rise and fall times. If the rise and fall times are shorter than 2.5 times a delay in the transmission line of the clock signal, the clock signal received by the receiver circuit may be significantly distorted and may be unusable as a valid signal. Such a problem may be referred to as ringing. In an attempt to reduce distortion and reflection, impedance matching may be implemented for electromagnetic wave transmission.

FIG. 1 is a circuit diagram illustrating a known termination circuit. Referring to FIG. 1, termination resistors R1 and R2, a PMOS transistor MP, and an NMOS transistor MN are serially connected between a supply voltage VDD and a ground voltage VSS. The PMOS transistor MP has a gate connected to the ground voltage VSS, and the NMOS transistor MN has a gate connected to the supply voltage VDD. In a termination circuit 100 of FIG. 1, impedance matching is implemented in parallel.

An impedance of a transmission line (to which an input signal INS is applied) is matched with impedances of the termination resistors R1 and R2. The waveform of a voltage level at the first node N1 (between the termination resistors R1 and R2) may show reduced distortion compared to the case when the termination resistors R1 and R2 are not connected with the PMOS transistor MP and the NMOS transistor MN.

In the termination circuit 100, however, the PMOS transistor MP and the NMOS transistor MN may be turned on all the time, and a path for current flow may be formed from the supply voltage VDD toward the ground voltage VSS. Thus, power consumption increases during transmission of the input signal INS may make it undesirable to use the termination circuit 100 in a low power-consumption device.

FIG. 2 is a circuit diagram illustrating another known termination circuit 200. Referring to FIG. 2, the termination resistors R1 and R2, the PMOS transistor MP, and the NMOS transistor MN are serially connected between the supply voltage VDD and the ground voltage VSS. The PMOS transistor MP has a gate connected to an inverter I1 that inverts the voltage level of the input signal INS and applies the inverted voltage level to the gate of the PMOS transistor MP. The NMOS transistor MN has a gate connected to an inverter I2 that inverts the voltage level of the input signal INS and applies the inverted voltage level to the gate of the NMOS transistor MN. In the termination circuit 200 of FIG. 2, impedance matching is implemented in parallel.

When the inverter I1 inverts the voltage level of the input signal INS during/after a transition from low to high, the PMOS transistor MP may be turned on. Then, a path for current flow can be formed between the first node N1 and the supply voltage VDD.

The voltage level at the first node N1 can be increased by the supply voltage VDD and may reach the level of the supply voltage VDD or ground voltage VSS. Thus, a relatively long time may be needed to invert the voltage level at the first node N1 from high to low and vice versa.

FIG. 3 is a waveform of the voltage level at the first node N1 of the termination circuit 200 of FIG. 2. Referring to FIG. 3, when the voltage level of the input signal INS is inverted to a high voltage level, the waveform of the voltage level at the first node N1 is also inverted a high voltage level. However, when the PMOS transistor MP is turned on, distortion may occur at the first node N1, as shown by the waveform in FIG. 3. In other words, the termination circuit 200 of FIG. 2 may provide lower power consumption compared to the termination circuit 100 of FIG. 1, but distortion may occur at the first node N1.

FIG. 4 is a circuit diagram illustrating still another known termination circuit 400. Referring to FIG. 4, the PMOS transistor MP, the NMOS transistor MN, and termination resistors R3 and R4 are serially connected between the supply voltage VDD and the ground voltage VSS. A first capacitor C1 is connected between the gate of the PMOS transistor MP and the first node N1 (which functions as a connection point of the termination resistors R3 and R4). A resistor R1 is connected between the supply voltage VDD and the gate of the PMOS transistor MP. A second capacitor C2 is connected between the gate of the NMOS transistor MN and the first node N1, and a resistor R2 is connected between the ground voltage VSS and the gate of the NMOS transistor MN.

The PMOS transistor MP and the NMOS transistor MN can be turned off using the first capacitor C1 and the second capacitor C2. If the input signal INS is input at a high voltage level, the second capacitor C2 may be charged and the NMOS transistor MN may be turned on for a moment, while the PMOS transistor MP is turned off. Electrical charges in the second capacitor C2 may dissipate through the ground voltage VSS, and then the NMOS transistor MN may be turned off. Thus, termination of the input signal INS may be inaccurately performed.

FIG. 5A is a graph showing impedances of the termination transistors R3 and R4 of the termination circuit 400 of FIG. 4. FIG. 5B is a waveform of the voltage level at the first node N1 of FIG. 4.

Referring to FIG. 5A, the impedances of the termination resistors R3 and R4 may be nearly infinite at time points immediately before the signal INS is input and after the NMOS transistor MN is turned on and off by the input signal INS.

Because the impedances of the termination resistors R3 and R4 may have to be maintained level with respect to a specific value to reduce ringing or reflection, however, the termination circuit 400 of FIG. 4 may not accurately perform termination of the input signal INS.

Referring to FIG. 5B, the waveform of the voltage level at the first node N1 may exhibit high overshoot and/or undershoot when the voltage level of the input signal INS transitions from low to high and/or from high to low. Known termination circuits may consume high power and/or distort signals.

SUMMARY

According to embodiments of the present invention, a termination circuit for a transmission line may include an input node, a pull-down circuit, and a pull-up circuit. The input node receives an input signal over the transmission line. The pull-down circuit is coupled between the input node and a first reference voltage, and the pull-down circuit is configured to provide an electrical path between the first reference voltage and the input node responsive to the input signal having a first voltage level. The pull-up circuit is coupled between the input node and a second reference voltage wherein the pull-up circuit is configured to provide an electrical path between the second reference voltage and the input node responsive to the input signal having a second voltage level. More particularly, the first reference voltage is less than the second reference voltage, and the first voltage level is greater than the second voltage level.

For example, the first voltage level may be a logic high voltage level, and the second voltage level may be a logic low voltage level. Moreover, the first reference voltage may be a ground voltage, and the second reference voltage may be a supply voltage.

In addition, the pull-down circuit may be further configured to block the electrical path between the first reference voltage and the input node responsive to the input signal having the second voltage level. Similarly, the pull-up circuit may be further configured to block the electrical current path between the second reference voltage and the input node responsive to the input signal having the first voltage level. The pull-down and pull-up circuits may also be configured to provide electrical paths between the input node and both of the first and second reference voltages at a same time during a transition of the input signal between the first and second voltage levels.

More particularly, the pull-down circuit may include a pull-down resistor and a pull-down transistor coupled in series between the input node and the first reference voltage. The pull-down circuit may also include a first input resistor connected between the input node and a control electrode (such as a gate) of the pull-down transistor. Moreover, the pull-down transistor may be an NMOS transistor.

The pull-up circuit may include a pull-up resistor and a pull-up transistor coupled in series between the input node and the second reference voltage. The pull-up circuit may also include a pull-up input resistor connected between the input node and a control electrode (such as a gate) of the pull-up transistor. Moreover, the pull-up transistor may be a PMOS transistor.

According to additional embodiments of the present invention, a method of terminating a transmission line may include receiving an input signal at an input node. An electrical path may be provided between a first reference voltage and the input node responsive to the input signal having a first voltage level. An electrical path may be provided between a second reference voltage and the input node responsive to the input signal having a second voltage level. In addition, the first reference voltage may be less than the second reference voltage, and the first voltage level may be greater than the second voltage level.

For example, the first voltage level may be a logic high voltage level, and the second voltage level may be a logic low voltage level. In addition, the first reference voltage may be a ground voltage, and the second reference voltage may be a supply voltage.

In addition, the electrical current path between the first reference voltage and the input node may be blocked responsive to the input signal having the second voltage level. Similarly, the electrical current path between the second reference voltage and the input node may be blocked responsive to the input signal having the first voltage level. In addition, electrical paths may be provided between the input node and both of the first and second reference voltages at a same time during a transition of the input signal between the first and second voltage levels.

BRIEF DESCRIPTION OF THE DRAWINGS

The above and other aspects and advantages of the present invention will become more apparent by describing in detail embodiments thereof with reference to the attached drawings in which.

DETAILED DESCRIPTION

The present invention will be described more fully hereinafter with reference to the accompanying drawings, in which typical embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. It will also be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

Figure 1:
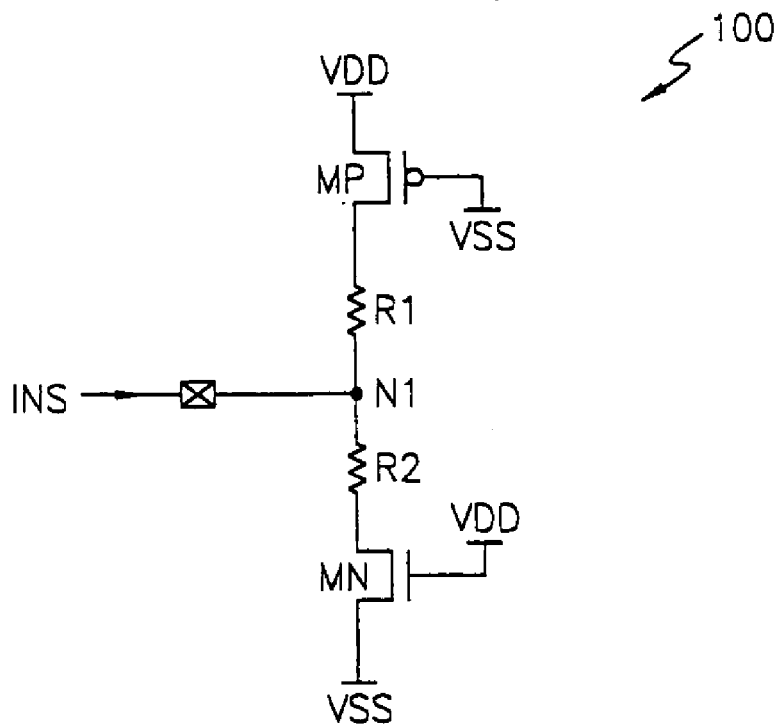
FIG. 1 is a circuit diagram illustrating a known termination circuit.
Figure 2:
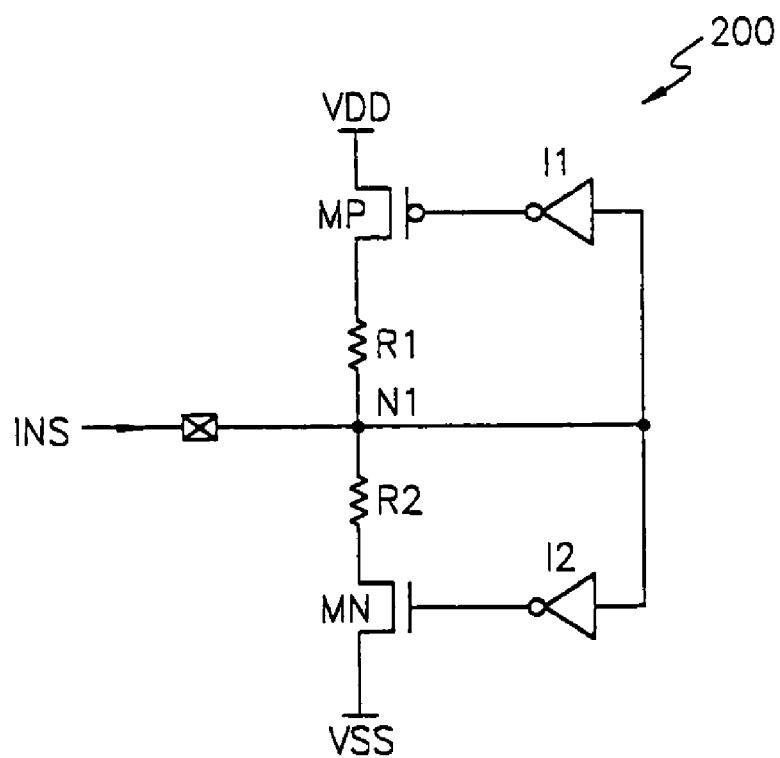
FIG. 2 is a circuit diagram illustrating another known termination circuit.
Figure 3:
FIG. 3 is a waveform of the voltage level at the first node of the known termination circuit of FIG. 2.
Figure 4:
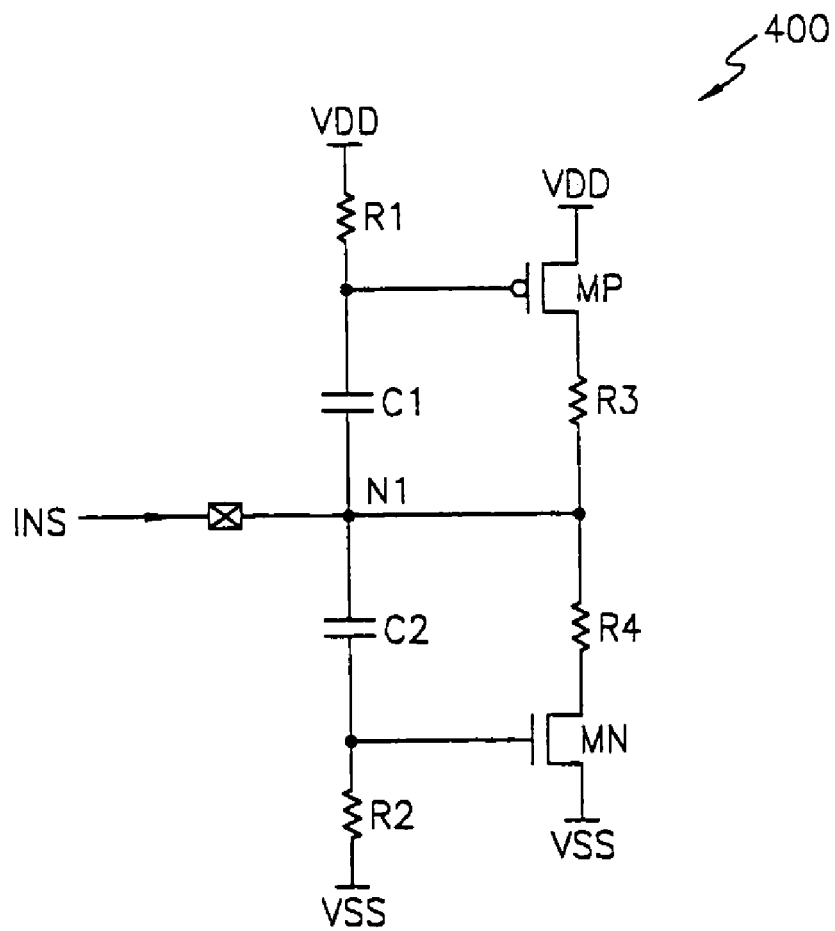
FIG. 4 is a circuit diagram illustrating still another known termination circuit.
Figure 5A:
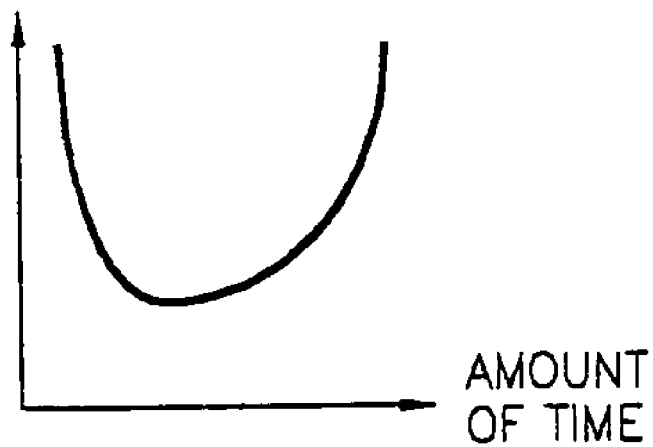
FIG. 5A is a graph showing impedances of termination transistors of the termination circuit of FIG. 4.
Figure 5B:
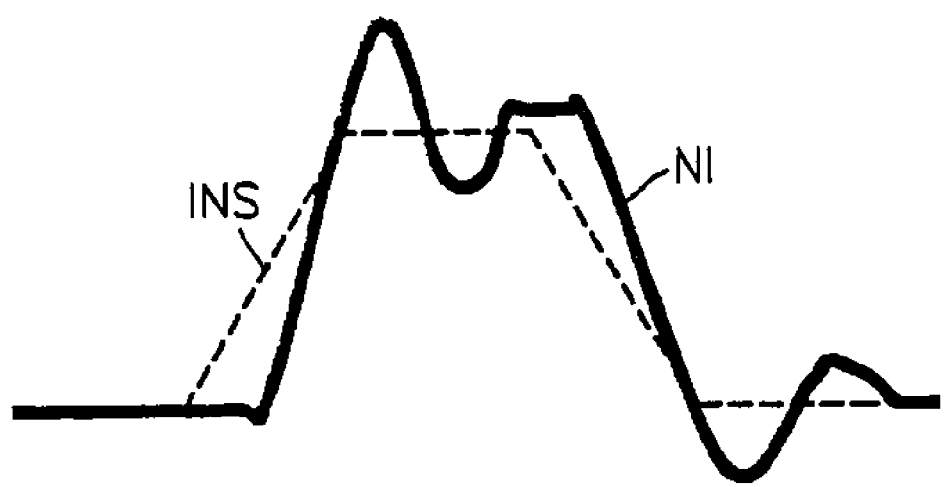
FIG. 5B is a waveform of a voltage level at the first node of the termination circuit of FIG. 4.
Figure 6:
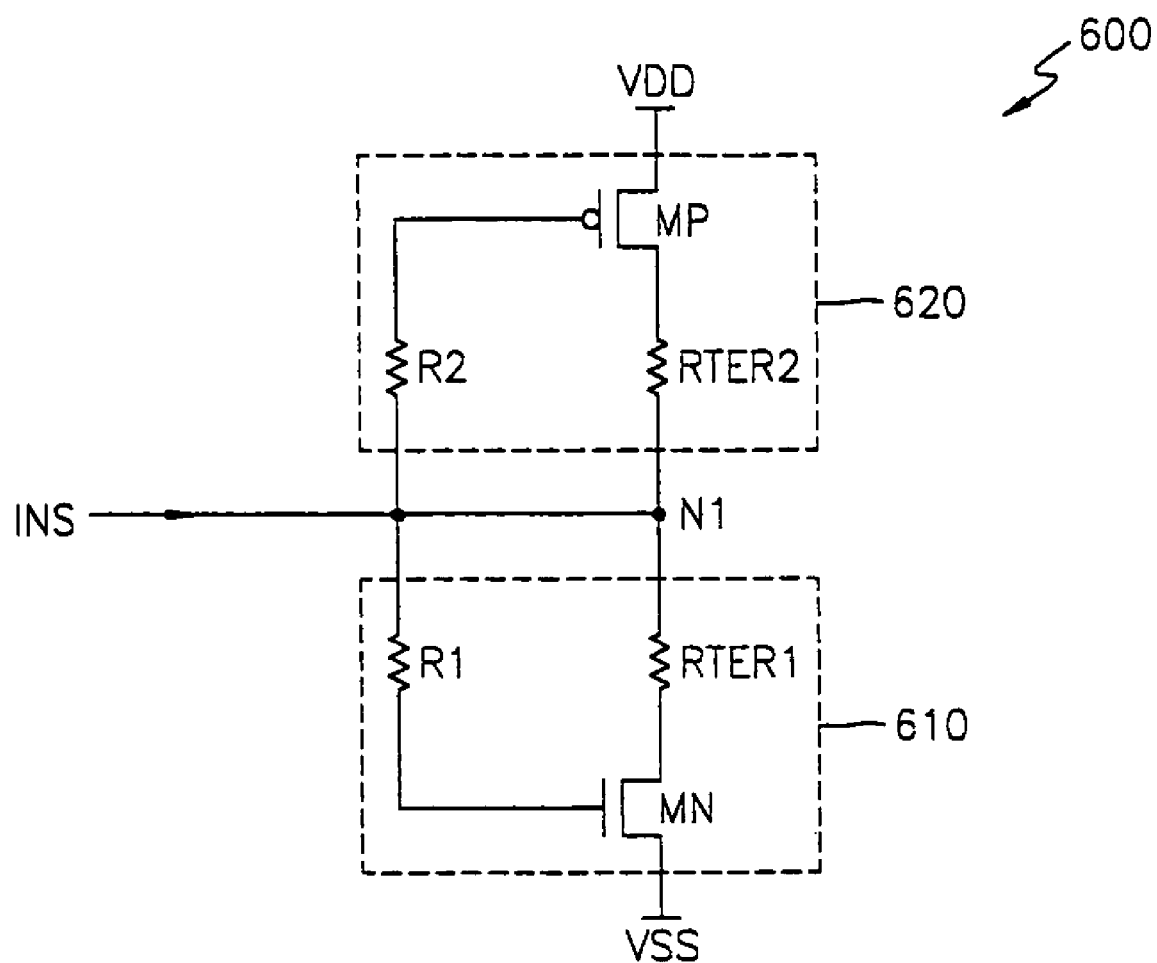
FIG. 6 is a circuit diagram illustrating a termination circuit according to embodiments of the present invention.

FIG. 6 is a circuit diagram illustrating a termination circuit according to embodiments of the present invention.

Referring to FIG. 6, a termination circuit 600 includes a first switching unit 610 and a second switching unit 620, and the termination circuit 600 may reduce ringing and dynamic current which may occur when an input signal INS is transmitted through a transmission line. The first switching unit 610 includes a first termination resistor RTER1 providing a path for current flow between a first node N1 and a first reference voltage VSS when the voltage level of the input signal INS is inverted to the first level. More specifically, the first switching unit 610 also includes a first transistor MN connected in series with the first termination resistor RTER1 between the node N1 and the first reference voltage Vss. The first transistor MN has a first end (source/drain) connected to the first voltage VSS and a gate receiving the input signal INS. The first termination resistor RTER1 is connected between the second end (source/drain) of the first transistor MN and the first node N1.

The first transistor MN can be an NMOS transistor, the first voltage VSS can be a ground voltage, and the first level can be a high voltage level. The first switching unit 610 may also include a first input resistor R1 used to protect the gate of the first transistor MN and connected between the first node N1 and the gate of the first transistor MN.

The second switching unit 620 includes a second termination resistor RTER2 providing a path for current flow between the first node N1 and a second reference voltage VDD when the input signal INS is inverted to the second level. More specifically, the second switching unit 620 also includes the second transistor MP connected in series with the second termination resistor RTER2 between the node N1 and the second reference voltage VDD. The second transistor MP has a first end connected to the second voltage VDD and a gate receives the input signal INS. The second termination resistor RTER2 is connected between a second end of the second transistor MP and the first node N1.

The second transistor MP may be a PMOS transistor, the second reference voltage VDD may be a supply voltage, and the second level may be low. The second switching unit 620 may further include a second resistor R2 used to protect the gate of the second transistor MP and positioned between the first node N1 and the gate of the second transistor MP.

The first and second switching units 610 and 620 may keep termination resistances level (and/or matched) with respect to a resistance of the transmission line when the voltage level of the input signal INS is inverted. The termination circuit 600 may be included in an integrated circuit semiconductor chip.

Hereinafter, the operation of the termination circuit 600 will be described with reference to FIG. 6. In the termination circuit 600 of FIG. 6, either the first switching unit 610 or the second switching unit 620 may be turned on, and the other is turned off, irrespective of whether the voltage level of the input signal INS is high or low. Thus, the path for current flow is not formed toward the first reference voltage (the ground voltage) VSS from the second voltage (the supply voltage) VDD, which may allow for a reduction in power consumption.

When the voltage level of the input signal INS is inverted from low to high, the first transistor MN is turned on, and the second transistor MP is turned off. The path for current flow is formed from the first node N1 toward the first voltage (the ground voltage) VSS having a voltage level opposite to that of the input signal INS, in this case, a low voltage level. Thus, the voltage level at the first node N1 does not reach the voltage level of the input signal INS, but reaches a voltage level lower than that of the input signal INS.

In the alternative case, if the voltage level of the input signal INS is inverted from high to low, the second transistor MP is turned on and the first transistor MN is turned off. Then, the path for current flow is formed from the first node N1 toward the second voltage (the supply voltage) VDD, and the voltage level at the first node N1 does not reach the voltage level of the input signal INS, but reaches a voltage level slightly higher than that of the input signal INS. Accordingly, an amount of time required for the voltage level at the first node N1 to be inverted from high to low may be reduced.

When the voltage level of the input signal INS is inverted, impedances of the first termination resistor RTER1 and the second termination resistor RTER2 can be continuously matched with the impedance of the transmission line through which the input signal INS is transmitted. The matching occurs because either the first transistor MN or the second transistor MP has already been turned on due to previously inverting the voltage level of the input signal INS.

Also, when the voltage level of the input signal INS is inverted, a small amount of time may be required for either the first transistor MN or the second transistor MP to be turned on or off. Thus, both the first transistor MN and the second transistor MP may be turned on for a moment.

At that moment, since it seems to the input signal INS that the first termination resistor RTER1 and the second termination resistor RTER2 are connected in parallel, the impedances of RTER1 and RTER2 can be constantly maintained level (and/or matched) with respect to a specific value. The first resistor R1 and the second resistor R2 are used to protect the gates of the first transistor MN and the second transistor MP, respectively, from damage by the input signal INS.

Figure 7A:
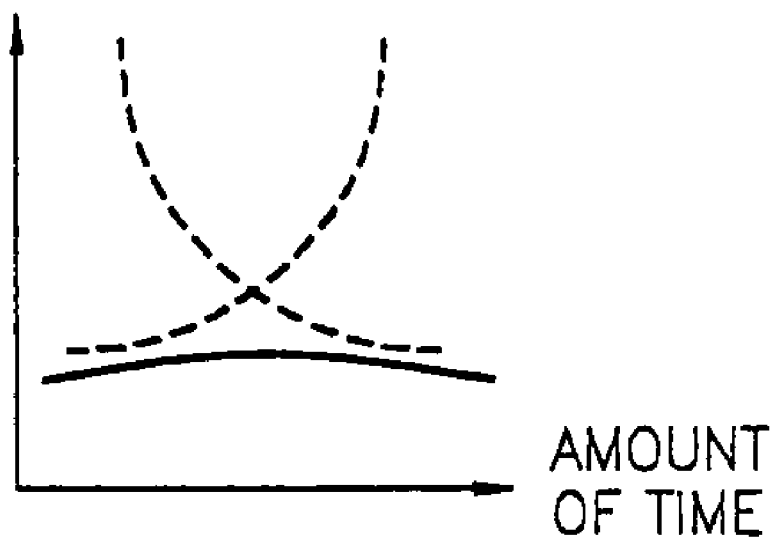
FIG. 7A is a graph showing impedances of termination resistors of FIG. 6 according to embodiments of the present invention.
Figure 7B:
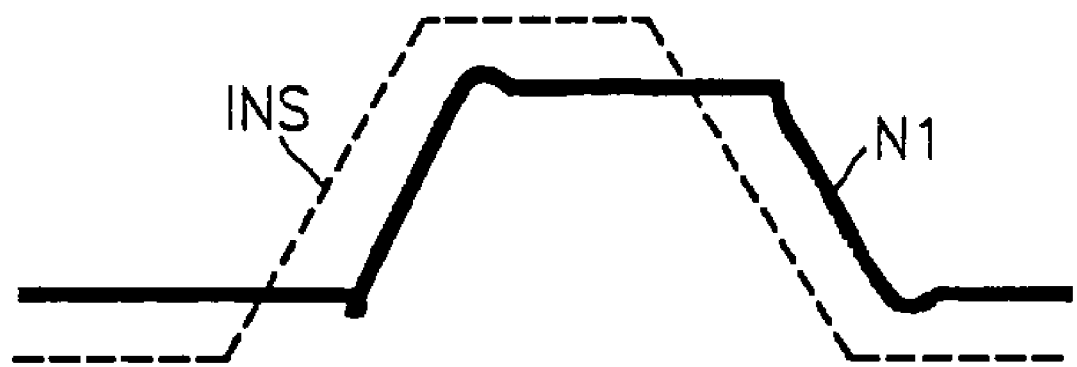
FIG. 7B is a waveform of a voltage level at the first node of the termination circuit of FIG. 6.

FIG. 7A is a graph showing the impedances of the first termination resistor RTER1 and the second termination resistor RTER2 of the termination circuit 600 of FIG. 6 according to embodiments of the present invention. FIG. 7B is a waveform of the voltage level at the first node N1 of the termination circuit 600 of FIG. 6.

Referring to FIG. 7A, the impedances of the first termination resistor RTER1 and the second termination resistor RTER2 (indicated by a bold line) may be constantly maintained relatively level with respect to a specific value. The dotted lines indicate the respective impedances of the first termination resistor RTER1 and the second termination resistor RTER2.

Referring to FIG. 7B, the amount of time required for the voltage level at the first node N1 to be inverted may be smaller than that required for the voltage level of the input signal INS to be inverted. An amount of time required for the termination circuit 600 to transmit a signal to a circuit (not shown), connected to the termination circuit 600 may be reduced.

Moreover, since the impedances of the first termination resistor RTER1 and the second termination resistor RTER2 are maintained level with respect to a specific value, the waveform of the voltage level at the first node N1 may exhibit reduced distortion. The termination circuit 600 can be included in an integrated circuit semiconductor chip.

A termination circuit according to second embodiments of the present invention may include a first termination unit and a second termination unit.

The first termination unit may include a first termination resistor that allows impedance matching to be performed using a ground voltage when the voltage level of the input signal is inverted from low to high. The second termination unit may include a second termination resistor that allows impedance matching to be performed using a supply voltage when the voltage level of the input signal is inverted from high to low.

The operation and configuration of the first termination unit may be the same as that of the first switching unit 610 in the first embodiment. The operation and configuration of the second termination unit may be the same as that of the second switching unit 620 in the first embodiments. Accordingly, detailed operations of the termination circuits according to the second embodiments of the present invention will not be described.

A termination circuit according to third embodiments of the present invention may include a pull-down unit and a pull-up unit. The pull-down unit may prevent the voltage level at the first node from reaching the voltage level of a second voltage when the voltage level of the input signal is inverted to a first level. The pull-up unit may prevent the voltage level at the first node from reaching the voltage level of a first voltage when the voltage level of the input signal is inverted to a second level.

The pull-down unit may function as and may have the same configuration as the first switching unit 610 of the first embodiments. The pull-up unit may function as and have the same configuration as the second switching unit 620 of the first embodiments. Accordingly, detailed operations of the termination circuit according to third embodiments of the present invention will not be described further herein.

As described above, termination circuits according to embodiments of the present invention can reduce power consumption, reduce an amount of time required for signal transmission, and may transmit a signal with reduced distortion in an output waveform.

Embodiments of the present invention may provide termination circuits which reduce power consumption and/or reduce distortion in an output waveform.

According to some embodiments of the present invention, a termination circuit may reduce ringing and/or dynamic current, which occur when an input signal is transmitted through a transmission line. The termination circuit may include a first switching unit and a second switching unit. The first switching unit includes a first termination resistor used to form a path for current flow between a first node and a first voltage when a voltage level of the input signal is inverted to a first level. The second switching unit includes a second termination resistor used to form a path for current flow between the first node and a second voltage when the voltage level of the input signal is inverted to a second level. Termination resistances of the first and second switching units may be maintained level to a resistance of the transmission line when the voltage level of the input signal is inverted.

The first switching unit may include a first transistor and a first termination resistor. A first end of the first transistor is connected to the first voltage, and a gate of the first transistor receives the input signal. The first termination resistor is connected between a second end of the first transistor and the first node.

The first switching unit may further include a first input resistor, used to protect the gate of the first transistor and positioned between the first node and the gate of the first transistor. The first transistor may be an NMOS transistor.

The second switching unit may include a second transistor and a second termination resistor. The second termination resistor includes a first end connected to the second voltage and a gate receiving the input signal. The second termination resistor is connected between a second end of the second transistor and the first node.

The second switching unit may also include a second resistor used to protect the gate of the second transistor. The second input transistor is positioned between the first node and the gate of the second transistor. The second transistor may be a PMOS transistor.

A voltage level of the first voltage may be the same as a voltage level of a ground voltage, and a voltage level of the second voltage may be the same as a voltage level of a supply voltage. The first level may be high and the second level may be low. The termination circuit may be included in an integrated circuit semiconductor chip.

According to other embodiments of the present invention, a termination circuit may reduce ringing and dynamic current which occur when an input signal is transmitted through a transmission line. The termination circuit may include a first termination unit and a second termination unit. The first termination unit includes a first termination resistor allowing impedance matching to be performed using a ground voltage when a voltage level of the input signal is inverted to high. The second termination unit includes a second termination resistor allowing impedance matching to be performed by using a supply voltage when a voltage level of the input signal is inverted to low. Termination resistance of the first and second termination units may be maintained level with respect to a resistance of the transmission line when the voltage level of the input signal is inverted.

The first termination unit may also include an NMOS transistor and a first termination resistor. A first end of the first NMOS transistor is connected to the ground voltage and a gate of the first NMOS transistor receives the input signal. The first termination resistor is connected between a second end of the NMOS transistor and a first node.

The first termination unit may also include a first input resistor used to protect the gate of the NMOS transistor and positioned between the first node and the gate of the NMOS transistor.

The second termination unit may also include a PMOS transistor and a second termination resistor. A first end of the second termination resistor is connected to the supply voltage and a gate receives the input signal. The second termination resistor is connected between a second end of the PMOS transistor and the first node.

The second termination unit may also include a second resistor used to protect the gate of the PMOS transistor and positioned between the first node and the gate of the PMOS transistor. The termination circuit may be included in an integrated circuit semiconductor chip.

According to yet other embodiments of the present invention, a termination circuit may reduce ringing and dynamic current which may occur when an input signal is transmitted through a transmission line. The termination circuit may include a pull-down unit and a pull-up unit. The pull-down unit may prevent a voltage level at a first node from reaching a voltage level of a second voltage when a voltage level of the input signal is inverted to a first level. The pull-up unit may prevent a voltage level at the first node from reaching a voltage level of a first voltage when a voltage level of the input signal is inverted to a second level.

The pull-down unit may further include an NMOS transistor and a first termination resistor. A first end of the NMOS transistor may be connected to the first voltage and a gate may receive the input signal. The first termination resistor is connected between a second end of the NMOS transistor and the first node. The pull-down unit may further include a first resistor used to protect the gate of the NMOS transistor, between the first node and the gate of the NMOS transistor.

The pull-up unit may further include a PMOS transistor and a second termination resistor. A first end of the PMOS transistor may be connected to the second voltage and a gate connected to receive the input signal. The second termination resistor is connected between a second end of the PMOS transistor and the first node.

The pull-up unit may further include a second resistor used to protect the gate of the PMOS transistor, between the first node and the gate of the PMOS transistor. A voltage level of the first voltage may be the same as a voltage level of a ground voltage, and a voltage level of the second voltage may be the same as a voltage level of a supply voltage. The first level may be high, and the second level may be low. The termination circuit may be included in an integrated circuit semiconductor chip.

While the present invention has been particularly shown and described with reference to embodiments thereof, it will be understood by those skilled in the art that various changes in form and details may be made therein without departing from the spirit and scope of the invention as defined by the appended claims and their equivalents.

What is claimed is:

1. A termination circuit for a transmission line, the termination circuit comprising:
   an input node receiving an input signal over the transmission line;
   an NMOS pull-down transistor coupled between the input node and a first reference voltage wherein the NMOS pull-down transistor is configured to provide an electrical path between the first reference voltage and the input node responsive to the input signal having a first voltage level; and
   a PMOS pull-up transistor coupled between the input node and a second reference voltage wherein the PMOS pull-up transistor is configured to provide an electrical path between the second reference voltage and the input node responsive to the input signal having a second voltage level, wherein the first reference voltage is less than the second reference voltage and wherein the first voltage level is greater than the second voltage level;
   wherein the NMOS pull-down transistor maintains the electrical path between the first reference voltage and the input node while the input signal is maintained steady state at the first voltage level;
   wherein the PMOS pull-up transistor maintains the electrical path between the second reference voltage and the input node while the input signal is maintained steady state at the second voltage level;
   a first input resistor coupled between the input node and a gate electrode of the NMOS transistor; and
   a second input resistor coupled between the input node and a gate electrode of the PMOS transistor.

2. A termination circuit according to claim 1 wherein the first voltage level comprises a logic high voltage level and wherein the second voltage level comprises a logic low voltage level.

3. A termination circuit according to claim 1 wherein the first reference voltage comprises a ground voltage and the second reference voltage comprises a supply voltage.

4. A termination circuit according to claim 1 wherein:
   the NMOS pull-down transistor is further configured to block the electrical path between the first reference voltage and the input node responsive to the input signal having the second voltage level; and
   the PMOS pull-up transistor is further configured to block the electrical current path between the second reference voltage and the input node responsive to the input signal having the first voltage level.

5. A termination circuit according to claim 4 wherein the NMOS pull-down transistor and the PMOS pull-up transistor are further configured to provide electrical paths between the input node and both of the first and second reference voltages at a same time during a transition of the input signal between the first and second voltage levels.

6. A termination circuit according to claim 1 further comprising:
   a pull-down resistor coupled in series with the NMOS pull-down transistor between the input node and the first reference voltage.

7. A termination circuit according to claim 1 further comprising:
   a pull-up resistor coupled in series with the PMOS pull-up transistor between the input node and the second reference voltage.

8. A termination circuit according to claim 1 further comprising:
   a pull-down resistor coupled in series with the NMOS pull-down transistor between the input node and the first reference voltage; and
   a pull-up resistor coupled in series with the PMOS pull-up transistor between the input node and the second reference voltage.

9. A termination circuit for a transmission line, the termination circuit comprising:
   an input node receiving an input signal over the transmission line;
   a pull-down circuit coupled between the input node and a first reference voltage wherein the pull-down circuit is configured to provide an electrical path between the first reference voltage and the input node responsive to the input signal having a first voltage level; and
   a pull-up circuit coupled between the input node and a second reference voltage wherein the pull-up circuit is configured to provide an electrical path between the second reference voltage and the input node responsive to the input signal having a second voltage level, wherein the first reference voltage is less than the second reference voltage and wherein the first voltage level is greater than the second voltage level;
   wherein the pull-down circuit maintains the electrical path between the first reference voltage and the input node while the input signal is maintained steady state at the first voltage level;
   wherein the pull-up circuit maintains the electrical path between the second reference voltage and the input node while the input signal is maintained steady state at the second voltage level;
   wherein the pull-down circuit includes a pull-down resistor and a pull-down transistor coupled in series between the input node and the first reference voltage;
   wherein the pull-down circuit includes a first input resistor connected between the input node and a control electrode of the pull-down transistor.

10. A termination circuit according to claim 9 wherein the pull-down transistor comprises an NMOS transistor.

11. A termination circuit for a transmission line, the termination circuit comprising:
   an input node receiving an input signal over the transmission line;

a pull-down circuit coupled between the input node and a first reference voltage wherein the pull-down circuit is configured to provide an electrical path between the first reference voltage and the input node responsive to the input signal having a first voltage level; and a pull-up circuit coupled between the input node and a second reference voltage wherein the pull-up circuit is configured to provide an electrical path between the second reference voltage and the input node responsive to the input signal having a second voltage level, wherein the first reference voltage is less than the second reference voltage and wherein the first voltage level is greater than the second voltage level;

wherein the pull-down circuit maintains the electrical path between the first reference voltage and the input node while the input signal is maintained steady state at the first voltage level;

wherein the pull-up circuit maintains the electrical path between the second reference voltage and the input node while the input signal is maintained steady state at the second voltage level;

wherein the pull-up circuit includes a pull-up resistor and a pull-up transistor coupled in series between the input node and the second reference voltage;

wherein the pull-up circuit includes a pull-up input resistor connected between the input node and a control electrode of the pull-up transistor.

12. A termination circuit according to claim 11 wherein the pull-up transistor comprises a PMOS transistor.

13. A termination circuit for a transmission line, the termination circuit comprising:

an input node receiving an input signal over the transmission line;

a pull-down circuit coupled between the input node and a first reference voltage wherein the pull-down circuit is configured to provide an electrical path between the first reference voltage and the input node responsive to the input signal having a first voltage level; and a pull-up circuit coupled between the input node and a second reference voltage wherein the pull-up circuit is configured to provide an electrical path between the second reference voltage and the input node responsive to the input signal having a second voltage level, wherein the first reference voltage is less than the second reference voltage and wherein the first voltage level is greater than the second voltage level;

wherein the pull-down circuit maintains the electrical path between the first reference voltage and the input node while the input signal is maintained steady state at the first voltage level;

wherein the pull-up circuit maintains the electrical path between the second reference voltage and the input node while the input signal is maintained steady state at the second voltage level;

wherein the pull-down circuit includes a pull-down resistor and a pull-down transistor coupled in series between the input node and the first reference voltage, and wherein the pull-up circuit includes a pull-up resistor and a pull-up transistor coupled in series between the input node and the second reference voltage;

wherein the pull-down circuit includes a first input resistor connected between the input node and a control electrode of the pull-down transistor, and wherein the pull-up circuit includes a pull-up resistor and a pull-up transistor coupled in series between the input node and the second reference voltage.

14. A termination circuit according to claim 13 wherein the pull-down transistor comprises an NMOS transistor, and wherein the pull-up transistor comprises a PMOS transistor.

15. A termination circuit according to claim 13 wherein the pull-up circuit includes a second input resistor connected between the input node and a control electrode of the pull-up transistor.

16. A termination circuit which reduces ringing and dynamic current, which occur when an input signal is transmitted through a transmission line to an input node, the termination circuit comprising:

a first switching unit which includes a first termination resistor used to form a path for current flow between the input node and a first voltage when a voltage level of the input signal is at a first level; and a second switching unit which includes a second termination resistor used to form a path for current flow between the input node and a second voltage when the voltage level of the input signal is at a second level, wherein the first voltage is less than the second voltage, wherein the first level is high and the second level is low, wherein termination resistance of the first and second switching units are maintained level to a resistance of the transmission line when the voltage level of the input signal is changed.

17. The termination circuit of claim 16, wherein the first switching unit comprises a first transistor, including a first end connected to the first voltage and a gate receiving the input signal, and the first termination resistor, which is connected between a second end of the first transistor and the input node.

18. The termination circuit of claim 17, wherein the first switching unit further comprises a first resistor, which is used to protect the gate of the first transistor and is positioned between the input node and the gate of the first transistor.

19. The termination circuit of claim 17, wherein the first transistor is an NMOS transistor.

20. The termination circuit of claim 16, wherein the second switching unit comprises a second transistor, including a first end connected to the second voltage and a gate receiving the input signal, and the second termination resistor, which is connected between a second end of the second transistor and the input node.

21. The termination circuit of claim 20, wherein the second switching unit further comprises a second resistor, which is used to protect the gate of the second transistor and is positioned between the input node and the gate of the second transistor.

22. The termination circuit of claim 21, wherein the second transistor is a PMOS transistor.

23. The termination circuit of claim 16, wherein a voltage level of the first voltage is the same as a voltage level of a ground voltage, and a voltage level of the second voltage is the same as a voltage level of a supply voltage.

24. The termination circuit of claim 16, wherein the termination circuit is mounted in a semiconductor chip.

25. A termination circuit which reduces ringing and dynamic current which occur when an input signal is transmitted through a transmission line to an input node, the termination circuit comprising:

a first termination unit which includes a first termination resistor coupled between the input node and a ground voltage allowing impedance matching at the input node to be performed by using the ground voltage when a voltage level of the input signal at the input node is high; and a second termination unit which includes a second termination resistor coupled between the input node and a supply voltage allowing impedance matching at the input node to be performed by using the supply voltage when a voltage level of the input signal at the input node is low, wherein termination resistance of the first and second termination units are maintained level to a resistance of the transmission line when the voltage level of the input signal changes.

26. The termination circuit of claim 25, wherein the first termination unit further comprises an NMOS transistor, including a first end connected to the ground voltage and a gate receiving the input signal, and the first termination resistor, which is connected between a second end of the NMOS transistor and the input node.

27. The termination circuit of claim 25, wherein the first termination unit further comprises a first resistor, which is used to protect the gate of the NMOS transistor and is positioned between the input node and the gate of the NMOS transistor.

28. The termination circuit of claim 25, wherein the second termination unit further comprises a PMOS transistor, including a first end connected to the supply voltage and a gate receiving the input signal, and the second termination resistor, which is connected between a second end of the PMOS transistor and the input node.

29. The termination circuit of claim 28, wherein the second termination unit further comprises a second resistor, which is used to protect the gate of the PMOS transistor and is positioned between the input node and the gate of the PMOS transistor.

30. The termination circuit of claim 25, wherein the termination circuit is mounted on a semiconductor chip.

31. A termination circuit which reduces ringing and dynamic current, which occur when an input signal is transmitted through a transmission line to an input node, the termination circuit comprising:

a pull-down unit which prevents a voltage level at the input node from reaching a voltage level of a second voltage when a voltage level of the input signal at the input node is at a first level; and a pull-up unit which prevents a voltage level at the input node from reaching a voltage level of a first voltage when a voltage level of the input signal at the input node is at a second level, wherein a voltage level of the first voltage is the same as a voltage level of a ground voltage, and a voltage level of the second voltage is the same as a voltage level of a supply voltage, wherein the first level is high, and the second level is low;

wherein the pull-down unit further comprises an NMOS transistor including a first end connected to the first voltage and a gate receiving the input signal, and a first termination resistor which is connected between a second end of the NMOS transistor and the input node;

wherein the pull-down unit further comprises a first resistor, which is used to protect the gate of the NMOS transistor, between the input node and the gate of the NMOS transistor.

32. A termination circuit which reduces ringing and dynamic current, which occur when an input signal is transmitted through a transmission line to an input node, the termination circuit comprising:

a pull-down unit which prevents a voltage level at the input node from reaching a voltage level of a second voltage when a voltage level of the input signal at the input node is at a first level; and a pull-up unit which prevents a voltage level at the input node from reaching a voltage level of a first voltage when a voltage level of the input signal at the input node is at a second level, wherein a voltage level of the first voltage is the same as a voltage level of a ground voltage, and a voltage level of the second voltage is the same as a voltage level of a supply voltage, wherein the first level is high, and the second level is low;

wherein the pull-up unit further comprises a PMOS transistor including a first end connected to the second voltage and a gate to receiving the input signal, and a second termination resistor which is connected between a second end of the PMOS transistor and the input node;

wherein the pull-up unit further comprises a second resistor, which is used to protect the gate of the PMOS transistor, between the input node and the gate of the PMOS transistor.

* * * * *